United States Patent
Tinsley et al.

(10) Patent No.: US 6,766,395 B1
(45) Date of Patent: Jul. 20, 2004

(54) EXTENDED COMMON MODE DIFFERENTIAL DRIVER

(75) Inventors: Steven J. Tinsley, Garland, TX (US); Julie Hwang, Richardson, TX (US); Mark W. Morgan, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 497 days.

(21) Appl. No.: 09/836,041

(22) Filed: Apr. 17, 2001

(51) Int. Cl.[7] .............................................. G06F 13/00
(52) U.S. Cl. .................... 710/100; 714/43; 710/305; 327/520
(58) Field of Search ............................. 710/100, 305; 327/215, 335, 365, 520; 326/30, 56, 17, 86, 83, 81; 714/47, 43

(56) References Cited

U.S. PATENT DOCUMENTS

| | | | | |
|---|---|---|---|---|
| 5,608,883 A | * | 3/1997 | Kando et al. ............... | 710/311 |
| 6,073,186 A | * | 6/2000 | Murray et al. ............... | 710/11 |
| 6,323,698 B1 | * | 11/2001 | Fletcher ...................... | 327/100 |
| 6,329,857 B1 | * | 12/2001 | Fletcher ...................... | 327/215 |
| 6,392,466 B1 | * | 5/2002 | Fletcher ...................... | 327/392 |
| 6,396,329 B1 | * | 5/2002 | Zerbe .......................... | 327/336 |
| 6,448,818 B1 | * | 9/2002 | Fletcher ...................... | 326/119 |

OTHER PUBLICATIONS

Tomasini, L. et al. "A Fully Differential CMOS Line Driver for ISDN" IEEE Journal of Solid–State Circuits, vol. 25, No. 2, Apr. 1990. pp. 546–554.*

* cited by examiner

Primary Examiner—Xuan M. Thai
(74) Attorney, Agent, or Firm—J. Dennis Moore; W. James Brady, III; Frederick J. Telecky, Jr.

(57) ABSTRACT

A driver (300) which meets wide common mode voltage requirements is provided. Output passgates (310) protect sensitive line driver circuitry (305) from extreme bus voltages; enabling/disabling circuits (315, 316) detect fault conditions to ensure the line driver is disabled when needed, and pull-ups (320) assist in line driver start up by preventing negative voltage conditions on the bus driven by the line driver.

20 Claims, 4 Drawing Sheets

US 6,766,395 B1

EXTENDED COMMON MODE DIFFERENTIAL DRIVER

BACKGROUND OF THE INVENTION

1. Technical Field of the Invention

The present invention relates generally to the field of transistor circuits and more particularly to a low voltage differential signal driver.

2. Description of the Related Art

Various standards have been promulgated in the field of data transmission. One type of data transmission is differential data transmission in which the difference in voltage levels between two signal lines form the transmitted signal. Differential data transmission is commonly used for data transmission rates greater than 100 megabits per second (Mbps) over long distances.

One application of differential data transmission is in a network using a bus to which multiple driver sources are attached. In one type of conventional circuit, the multiple drivers are connected to a common bus, in which only one driver may transmit at a time. The remaining drivers are typically in a high impedance state so as to not overload the bus. Since large positive and negative common mode signals may appear at the driver output terminals connected to a bus system, the maintenance of a high impedance over a wide common mode voltage range independent of whether the driver is powered or not, is desirable. Large positive and negative common mode signals seen across a bus can be caused by ground offsets among various drivers, which could drive the bus to voltage levels that could prove damaging to other devices attached on the bus.

In a multipoint system it is desirable to have a robust driver capable of withstanding a wide common mode range. Each driver in the system should also be very high impedance when disabled, so the leakage currents of disabled drivers do not degrade the transmission of data. Also, the driver should not be allowed to supply excessive currents which could damage the bus itself.

An example of a conventional low voltage differential signal (LVDS) driver circuit 100 is shown in FIG. 1A. The output terminals 102 and 104 form a pair of single-ended signals, one of which is the inverse of the other. The difference between these two signals constitutes the differential signal. This signal is essentially the voltage across the resistive load between y and z, which is either positive or negative depending on the direction of current flow across the load. The LVDS driver circuit 100 includes a direct current constant current source I0 and sink I1 coupled to voltage supply VCC and ground, respectively, and four n-channel metal, oxide semiconductor (NMOS) switches MN0, MN1, MN5 and MN6. The four transistor switches MN0, MN1, MN5 and MN6 are controlled by input voltage signals pos 106 and neg 108, and direct current through a load resistance between output pins y and z as indicated by arrows 110 and 112. The input voltage signals pos and neg are typically rail-to-rail voltage swings.

The gates of NMOS switches MN0 and MN6 are coupled together to receive input voltage signal pos. Similarly, the gates of NMOS switches MN1 and MN5 are coupled together to receive input voltage signal neg.

For operation of the LVDS driver circuit 100, two of the four NMOS switches turn on at a time to steer current from current source I0 to generate a voltage across a resistive load between outputs y and z. To steer current through the resistive load in the direction indicated by arrow 110, input signal neg goes high turning on NMOS switches MN1 and MN5. When input signal neg goes high, input signal pos goes low to keep NMOS switches MN0 and MN6 off during the time NMOS switches MN1 and MN5 are on. Conversely, to steer current through the resistive load in the direction indicated by arrow 112, input signal pos goes high and is applied to transistor switches MN0 and MN6 to make them conduct. Input signal neg goes low to keep MNOS switches MN1 and MN5 off during this time. As a result, a full differential output voltage swing can be achieved.

Circuit 120 is a typical common mode voltage regulator type circuit designed to regulate the center point of the driver circuit 100 during normal operation and FIG. 1B illustrates predriver logic which enables the pos and neg signals. The aforementioned drive circuit has a limited output voltage range over which the circuit functions properly.

SUMMARY OF THE INVENTION

The present invention achieves technical advantages in providing a differential signal to an external bus which can be driven by a plurality of devices. The invention includes a line driver configured to enable transmission of a differential output signal to the external bus. The invention further includes a voltage limiter which is electrically coupled to the line driver and the bus to limit voltage on the line driver. The voltage limiter and line driver can be enabled and disabled in response to voltage conditions on the external bus. A pull-up circuit can be provided to assist start-up of the line driver by preventing a negative voltage condition on the external bus.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

The current proposed M-LVDS standard (Project Number PN-4828-2000 for Multipoint Data Interchange) specifies low-voltage differential signaling drivers and receivers for data interchange across half-duplex or multipoint data bus structures. The current revision of the proposed standard calls for a data transmission driver with an extended common mode voltage range of −1.4 to 3.8 V. In addition to requiring an output leakage current less than 32 $\mu$A through this range during high-impedance or power-off states, the M-LVDS standard also specifies a maximum output current of 43 mA per pin when the driver output terminals are short-circuited to a variable voltage source from −1 to 3.4 V. This requirement is designed to limit current output to a common bus during contention between multiple drivers.

Figure 1A:
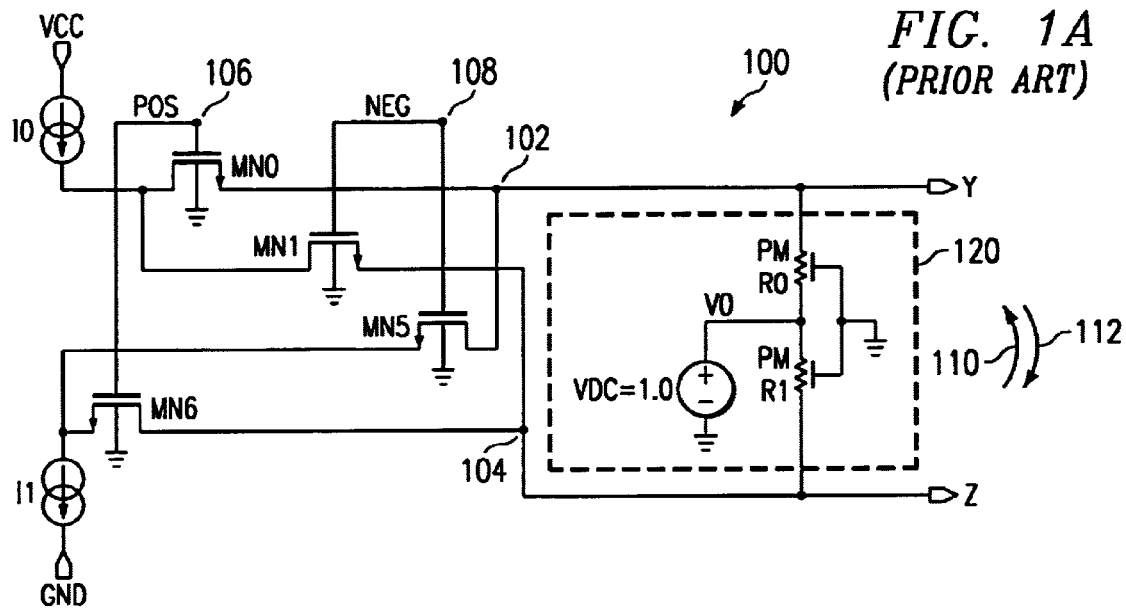
FIG. 1A illustrates a low voltage differential signal driver circuit.
Figure 1B:
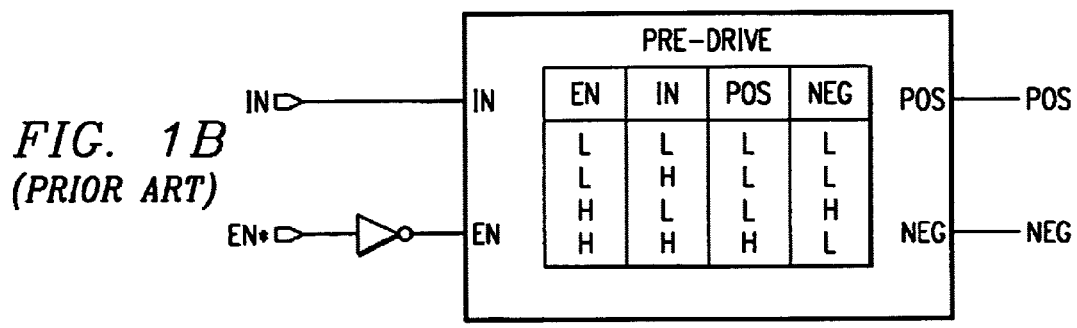
FIG. 1B illustrates predriver logic for the low voltage differential signal driver circuit of FIG. 1A.

Most low-voltage differential drivers, like the one illustrated in FIG. 1, have output stages consisting of a current source and sink with a switching H bridge (MN0, MN1, MN5, MN6) which controls the direction of current flow through a differential load, connected between pins y and z. This topology is incapable of withstanding the excessive output voltages required by the aforementioned M-LVDS standard. For example, applying a large negative voltage (such as −1V) to the output will turn on NMOS backgate diodes to ground, resulting in excessive output currents. During tri-state, a large enough negative voltage could result in a Vt drop from the grounded gate to the source, turning on a transistor that has been disabled. On the opposite extreme of the voltage requirement, a large positive voltage can result in device breakdown by exceeding Vgs limits. In order to achieve a signaling rate of several hundred Mbps and run off a 3.3 V supply, fast switching 3V devices are preferably used in the H bridge of the driver. However, in some processes, these devices may not be rated high enough for proper operation. For example, 3 V MOS are only rated to a maximum Vgs of 3.6 V for certain 0.6 u BiCMOS processes, which is below the maximum positive output voltage of 3.8 V of the current proposed M-LVDS standard.

Figure 2:
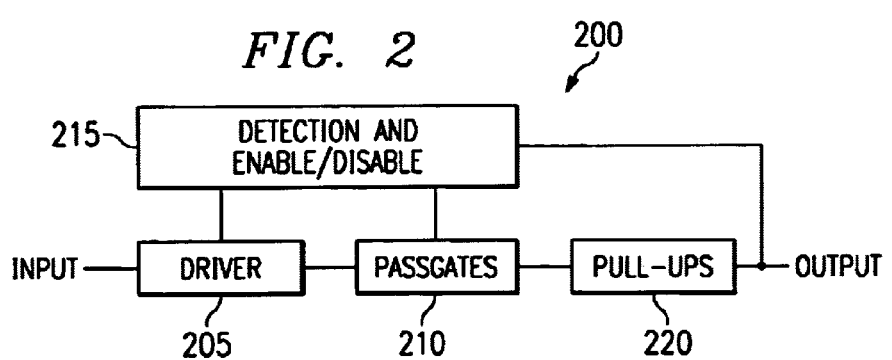
FIG. 2 illustrates a block diagram of a differential driver in accordance with an embodiment of the present invention.

FIG. 2 illustrates a block circuit diagram 200 of an exemplary embodiment of the present invention. The circuit 200 includes a driver circuit 205, 5V devices 210, detection and enabling/disabling circuitry 215, and pull-ups 220. The driver circuit 205 can be, for example, the low voltage differential driver 100 shown in FIGS. 1A and 1B. The circuitry of the driver circuit 205 is electrically protected from extreme voltage requirements (such as associated with the aforementioned M-LVDS standards) by a voltage limiter implemented, for example, by passgates 210. For example, the passgates 210 can be configured to limit voltages at the output nodes of the driver circuit 205 to a MOS threshold voltage below Vcc. Thus, 3V MOS type components can be used in the extended common mode voltage range without exceeding the electrical operating rating of the components. The passgates have a breakdown voltage exceeding the common mode voltage requirements. The passgates 210 are also configurable to limit the leakage current generally experienced from internal circuits. The detection and enable/disable circuit 215 is configured to detect an electrical condition on the bus which could damage and/or compromise proper operation of the drive circuit 205, such as a negative voltage condition. The detection and enable/disable circuit 215 is further configured to enable enable/disable signaling to both the passgate 210 and the driver circuit 205 upon detection of a compromising electrical condition. The pull-ups 220 are used to pull bus voltage up to a level high enough to overcome negative voltage sensing circuitry (not shown) of the detection and enable/disable circuit 215 for a driver startup condition when the bus has been initialized to a negative value. For example, when the driver circuit 205 is signaled to drive during an initialized negative voltage condition on the bus, the negative voltage sensing circuitry may disable the driver circuit from driving if the pull-ups 220 do not pull-up the bus voltage to overcome the disablement threshold.

Figure 3A:
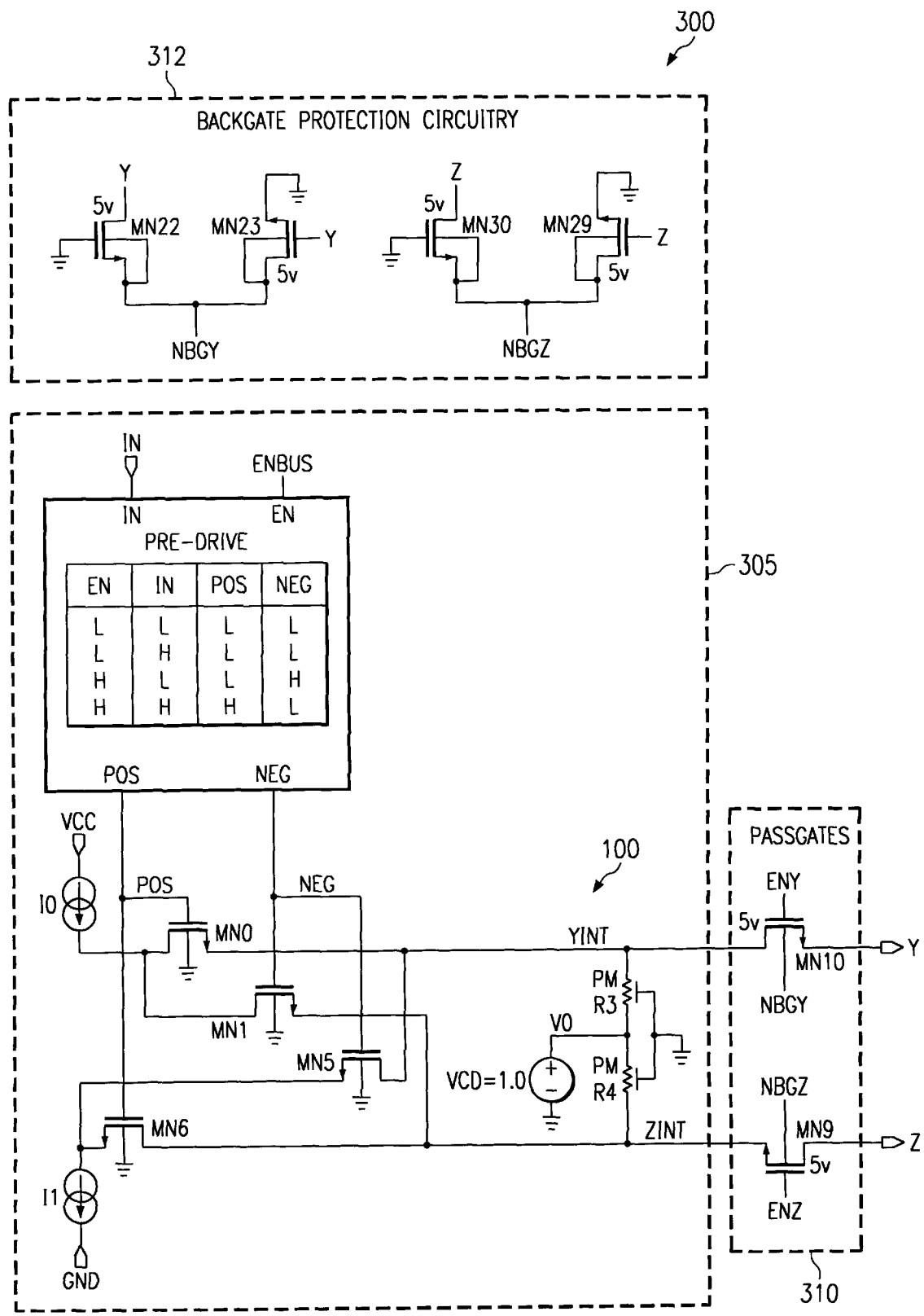
FIG. 3A illustrates a first circuit diagram portion of a differential driver in accordance with an embodiment of the present invention.
Figure 3B:
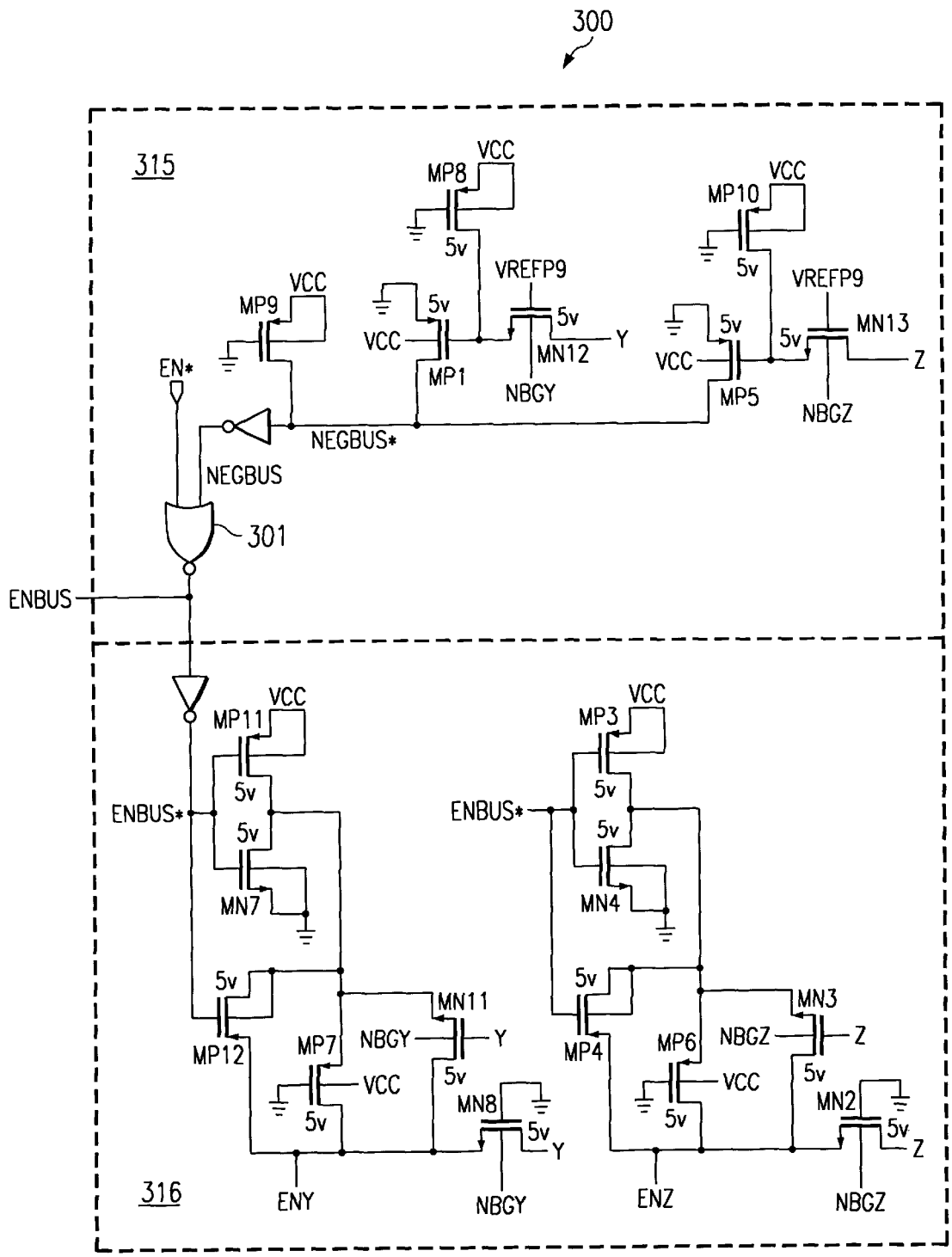
FIG. 3B illustrates a second circuit diagram portion of the differential driver of FIG. 3A.
Figure 3C:
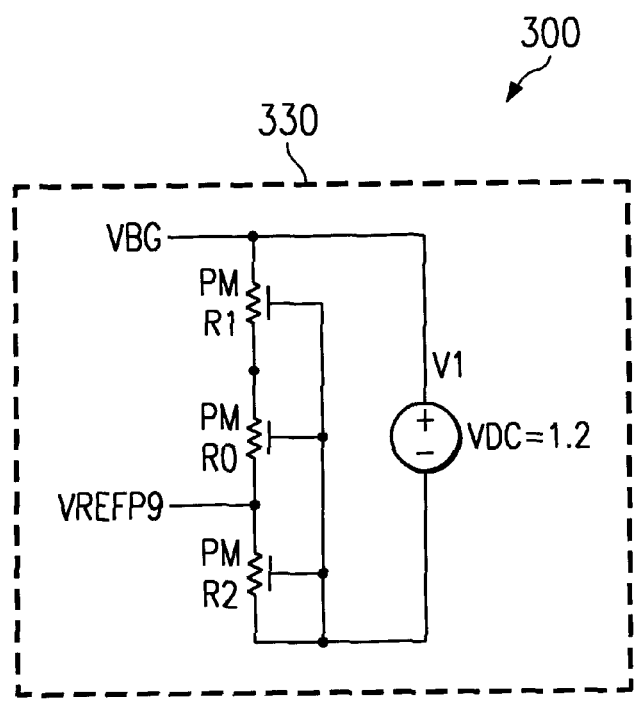
FIG. 3C illustrates a third circuit diagram portion of the differential driver of FIGS. 3A and 3B.
Figure 3C:
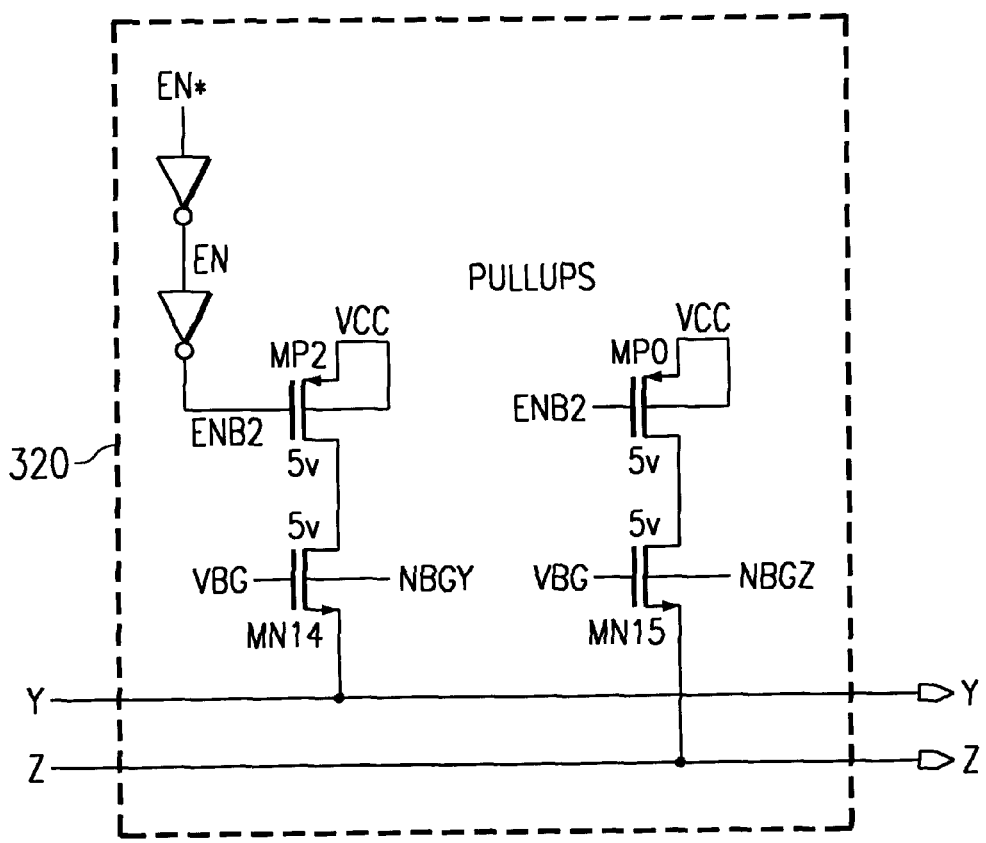

Referring now to FIGS. 3A, 3B and 3C (herein collectively referred to as FIG. 3) there is shown an exemplary embodiment of a differential driver apparatus 300 in accordance with the present invention. The differential driver apparatus 300 includes a driver 305 (e.g., the same driver 100 of FIGS. 1A and 1B) that is suitably protected to withstand the electrical requirements of the aforementioned M-LVDS standard. Also shown are output passgates 310, detection circuitry 315, enabling/disabling circuitry 316, pull-ups 320 and reference circuit 330.

The driver circuit 305 includes predriver logic circuitry and common mode voltage regulator circuitry. The passgates 310 are provided as two MOS type devices MN9 and MN10 which protect internal driver circuitry and limit leakage current. When the pass gates MN9 and MN10 are enabled, they block high voltages, limiting the voltage at internal nodes yint and zint to a MOS threshold voltage below VCC. This voltage limiting is acceptable because the maximum output voltage at these nodes is less than 1.6V during normal operation. During tri-state, the pass gates MN9 and MN10 are disabled, thereby blocking positive and negative voltage from the internal nodes and preventing overstress and excessive tri-state leakage from internal circuits. As high voltage devices, MN9 and MN10 can withstand the wider voltage range of the M-LVDS standard.

Regarding the backgate protection circuitry 312, when the bus is pulled below ground, the backgates of the NMOS devices MN10 and MN9 are suitably biased to prevent excessive leakage currents from the parasitic backgate diode. Under normal operation, nbgy and nbgz, the backgate nodes, are connected to ground through MN23 and MN29 respectively. When the bus goes below ground, the MN22 and MN30 devices are turned on, connecting the backgate and the bus together, and shorting out the parasitic diode.

In addition to the pass gates MN9 and MN10, the differential driver 300 includes circuitry to determine if the pass gates should be disabled to protect parts of the driver circuit 305. The driver circuit 305 and passgates 310 are disabled when the enable input signal en* is high (driver in tri-state) and also when the voltage on the output at either of the pins y or z is pulled below ground while en* is low (driver enabled). The later case arises during a fault condition when the driver circuit 305 is enabled but the bus has been pulled to a negative value because of shorting or driver contention, for example. In this case, the driver circuit 305 is disabled to prevent damage to internal circuits and the bus caused by excessive output currents.

The enabling/disabling circuitry 316 implements the above-described enabling/disabling scheme. When the signal enbus is high, nodes eny and enz are pulled high, enabling passgates MN9 and MN10. When enbus is low, eny and enz are pulled low, disabling the passgates. If the output voltage on y or z goes below ground while the passgates are disabled, corresponding MOS devices MN2 and MN8 of circuit 316 turn on and couple the bus voltage to enz and eny respectively. This shorts the gate and drain of passgates MN9 and MN10, keeping them disabled.

When enz and eny are coupled to a negative bus voltage, additional leakage current could come from the devices used to pull-up and pull-down the nodes. The blocking devices MP7, MN11, MP6, and MN3 are shut off when enz and eny are below ground (gnd), protecting the pull-downs MN7 and MN4 from negative voltage and preventing leakage to ground through MN7 and MN4 and their respective back-gate diodes.

The level of enbus, the signal which enables or disables the driver circuit 305, is determined by the detection circuitry 315. The signal enbus is only high, enabling the driver circuit 305 and passgate 310, when the active-low enable input signal en* is activated low and the bus voltage is positive, in other words, $$enbus = \overline{en^*} \cdot \overline{negbus}.$$

Using deMorgan's Theorem, the equivalent expression is $$enbus = \overline{en^* + negbus},$$

which is implemented in the circuit by NOR gate 301. The signal negbus acts as a detection flag for the voltage on the bus, going high when the bus voltage is negative and going low when the bus voltage is above ground.

The detection flag is generated through the various through-gates and pull-up devices of the detection circuit 315. Normally, negbus*, the inversion of negbus, is pulled to VCC through MP9. The two pull-downs MP1 and MP5 are kept off by the weak pull-ups on their gates. When y and z are at about zero volts or below, the through-gates MN12 and MN13 respectively turn on, passing the voltage of y and z respectively to the gates of the pull-downs MP1 and MP5. The pull-downs (either or both) can then turn on and pull negbus* to ground. When the bus is below ground, the weak pull-ups MP8 and MP10 will be a source of leakage, however, they can be suitably sized to leak only a few microamps.

In some situations, the bus may be initialized to a negative voltage, possibly because it was driven by a different driver with a negative ground offset, for example. In such circumstances, if the driver 305 is newly enabled using the enable input signal en*, the driver circuit 305 will not begin driving because a negative bus voltage will be detected by the detection circuitry 315 which will prevent the differential driver 300 from driving.

This situation can be avoided by operation of the pull-ups 320 which are connected to the outputs of the differential driver apparatus 300. Each of the pull-ups at 320 includes a NMOS switch in series with a PMOS switch. Whether or not the PMOS switch is enabled is independent of the bus voltage. The pull-ups 320 are switched according to the regular enable input signal en*, so that when the driver circuit 305 should be enabled, the pull-ups 320 are enabled as well. Furthermore, when the driver circuit 305 is disabled, the pull-ups 320 are disabled, thereby eliminating the pull-up 320 as an additional source of leakage. Again, all devices are 5V tolerant and the two NMOS devices MN14 and MN15 have backgate protection circuits 312. When the bus is pulled below ground, the backgates of the NMOS devices MN14 and MN15 are suitably biased to prevent excessive leakage currents from the parasitic backgate diode. Under normal operation, nbgy and nbgz, the backgate nodes, are connected to ground through MN23 and MN29 respectively. When the bus goes below ground, the MN22 and MN30 devices are turned on, connecting the backgate and the bus together, and shorting out the parasitic diode.

In some embodiments, the pull-ups 320 conduct a maximum of 3 mA of pull-up current, pulling the voltage of nodes y and z up to a maximum voltage of about 300 mV. This voltage level is high enough to overcome the negative voltage sensing circuitry of the detection circuit 315, allowing the driver to turn on. This voltage level is also low enough so that when the driver is operating normally, the voltage on y and z is too high to generate an adequate Vgs on MN14 and MN15, thus, the pull-up devices will be in cutoff and will not interfere with the normal operation of the driver.

The reference circuit 330 provides a predetermined reference voltage to selected transistor devices in the detection circuitry 315 and pull-ups circuitry 320. In the detection circuitry 315, the reference circuitry 330 approximately biases the gates of MN12 and MN13 to the turn on threshold. Thus, when pins y and z are near ground, the devices will begin to turn on. The reference circuit 330 provides a bias of 1.2 V to the gates of MN14 and MN15 in the pull-ups circuitry 320. This limits the amount of pullup current supplied by the pullup devices, limits the voltage to which they can pull the bus up to a Vt below 1.2 V, and ensures that the pullups will not interfere with the normal operation of the driver since there will not be a large enough Vgs on MN14 and MN15 when the driver is running.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus for providing a differential signal to an external bus, said apparatus comprising:
    a line driver having first and second output nodes for driving said bus, said line driver configured to provide a differential signal at said output nodes;
    a voltage limiter electrically coupled to each of said output nodes and configured to provide a predetermined voltage limit at said output nodes; and
    a control circuit coupled to said voltage limiter and having an input for receiving information indicative of conditions on said bus, said control circuit responsive to said information for enabling and disabling operation of said voltage limiter.

2. The apparatus of claim 1, wherein said voltage limiter includes first and second passgates respectively coupled to said first and second output nodes.

3. The apparatus of claim 1, wherein said control circuit is further coupled to said line driver and is further responsive to said information for enabling and disabling operation of said line driver.

4. The apparatus of claim 3, including a pull-up circuit for coupling to said bus to assist said control circuit in start-up enablement of said line driver by preventing a negative voltage condition on said bus at start-up enablement.

5. The apparatus of claim 4, wherein said pull-up circuit is configured to raise a voltage on said bus above a negative voltage sensing threshold of said control circuit for said start-up enablement of said line driver when said negative voltage condition would otherwise exists on said bus before said start-up enablement.

6. The apparatus of claim 3, wherein said circuit disables operation of said line driver upon detecting a bus voltage of approximately zero and below zero.

7. The apparatus of claim 1, wherein said line driver further comprises a set of metal oxide semiconductor (MOS) devices with a breakdown voltage, and wherein said voltage limiter limits voltage on said MOS devices to a value below said breakdown voltage.

8. The apparatus of claim 1, wherein said voltage limiter comprises first and second n-channel metal oxide semiconductor (NMOS) passgate switches respectively coupled to said first and second output nodes, each said switch having a backgate protection circuit and wherein each said NMOS switch exhibits a breakdown voltage above a predetermined common mode voltage.

9. The apparatus of claim 1, wherein said control circuit includes an input for receiving a tri-state signal, said control circuit configured to disable operation of said line driver in response to either of said tri-state signal and a negative voltage condition on said bus.

10. A differential data transmission apparatus for use with a common bus driven by another device, comprising:
   a line driver circuit coupled to said common bus and comprising a set of metal oxide semiconductor (MOS) devices configured to enable transmission of a differential signal to said common bus;
   a passgate circuit comprising a MOS device and an associated backgate protection circuit, said MOS device exhibiting a voltage breakdown of greater than 3.8, said passgate circuit coupled to said line driver circuit and said common bus;
   a control circuit configured to provide enable and disable signaling to said line driver circuit and said passgate circuit, said control circuit comprising:
      a detection circuit configured to detect a negative voltage condition on said common bus, wherein a disable signal is sent to said line driver circuit upon detection of said negative voltage condition during a data transmission; and
      a passgate control circuit coupled to said passgate circuit and configured to enable and disable said passgate circuit; and
      a pull-up circuit coupled to said common bus and configured to raise a voltage on said common bus above a negative voltage sensing threshold of said detection circuit during start-up enablement of said line driver circuit when said common bus would otherwise assume a negative voltage condition at start-up enablement.

11. A differential data transmission system operating within a predetermined common mode voltage range, said system comprising:
   a line driver having an output and configured to enable transmission of a differential data signal via said output;
   a common bus coupled to said line driven output and configured to receive said differential data signal and other signals from other devices;
   a passgate coupled to said line driver and configured to provide a predetermined voltage limit at said line driver output; and
   a control circuit coupled to said line driver and said passgate and said common bus and configured to enable and disable operations of said line driver and said passgate in response to conditions on said common bus.

12. The system of claim 11, wherein said control circuit comprises:
   a detection circuit configured to detect a negative voltage condition on said common bus and to activate a disable control signal to said line driver in response to said negative voltage condition; and
   a passgate control circuit coupled to said detection circuit and configured to enable and disable operation of said passgate in response to said disable control signal and voltage conditions on said common bus.

13. The system of claim 11 further comprising a pull-up circuit coupled to said common bus and configured to assist said control circuit in start-up enablement of said line driver by preventing a negative voltage condition on said common bus at start-up enablement.

14. The system of claim 13, wherein said pull-up device is further configured to raise a voltage on said common bus above a negative voltage sensing threshold of said control circuit for said start-up enablement of said line driver when said negative voltage condition would otherwise exist on said common bus at start-up enablement.

15. The system of claim 11, wherein said line driver further comprises a plurality of metal oxide semiconductor (MOS) devices coupled to said line driver output and exhibiting a predetermined breakdown voltage.

16. The system of claim 15, wherein said passgate limits voltage on said plurality of MOS devices to a value below said predetermined breakdown voltage.

17. The system of claim 11, wherein said control circuit sends said disable control signal to said line driver upon detecting a common bus voltage of approximately zero and below zero.

18. The system of claim 11, wherein said passgate comprises an n-channel metal oxide semiconductor (NMOS) switch and an associated backgate protection circuit, and wherein said NMOS switch further exhibits a breakdown voltage above a predetermined common mode voltage.

19. The system of claim 11, wherein said control circuit includes an input for receiving a tri-state signal, said control circuit configured to disable operation of said line driver in response to either of said tri-state signal and a negative voltage condition on said bus.

20. A differential data transmission system operating within a positive and negative common mode voltage range, said system comprising:
   a line driver circuit comprising a set of metal oxide semiconductor (MOS) devices configured to enable transmission of a differential data signal;
   a common bus coupled to said line driver and configured to receive said differential data signal and other signals from other line driver type circuits;
   a passgate circuit coupled to said line driver circuit and said common bus, and comprising a MOS switch and an associated backgate protection circuit, said MOS switch exhibiting a breakdown voltage greater than a maximum range limit of said positive and negative common mode voltage range;
   a control circuit coupled to said line driver circuit and said passgate circuit and said common bus and configured to provide enable and disable control signaling to said line driver circuit and said passgate circuit, said control circuit further comprising:
      a detection circuit configured to detect a negative voltage condition on said common bus, wherein a disable signal is sent to said line driver circuit upon detection of said negative voltage condition during a data transmission; and
      a passgate control circuit coupled to said passgate circuit and configured to enable and disable said passgate circuit; and
      a pull-up circuit coupled to said common bus and configured to raise a voltage on said common bus above a negative voltage sensing threshold of said detection circuit during start-up enablement of said line driver circuit when said common bus would otherwise assume a negative voltage condition at start-up enablement.

* * * * *